United States Patent Office 2,984,888
Patented May 23, 1961

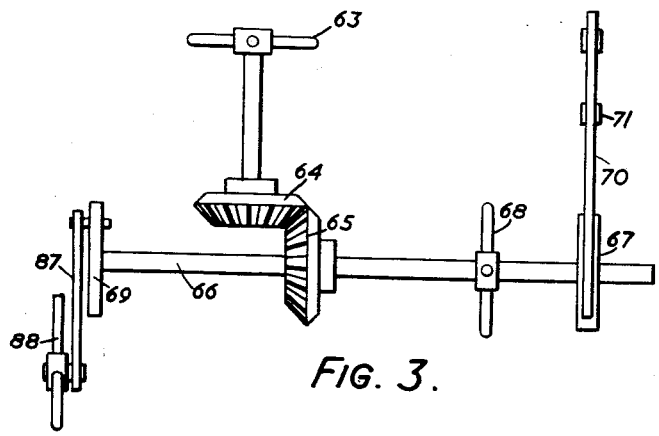
FIG. 3.
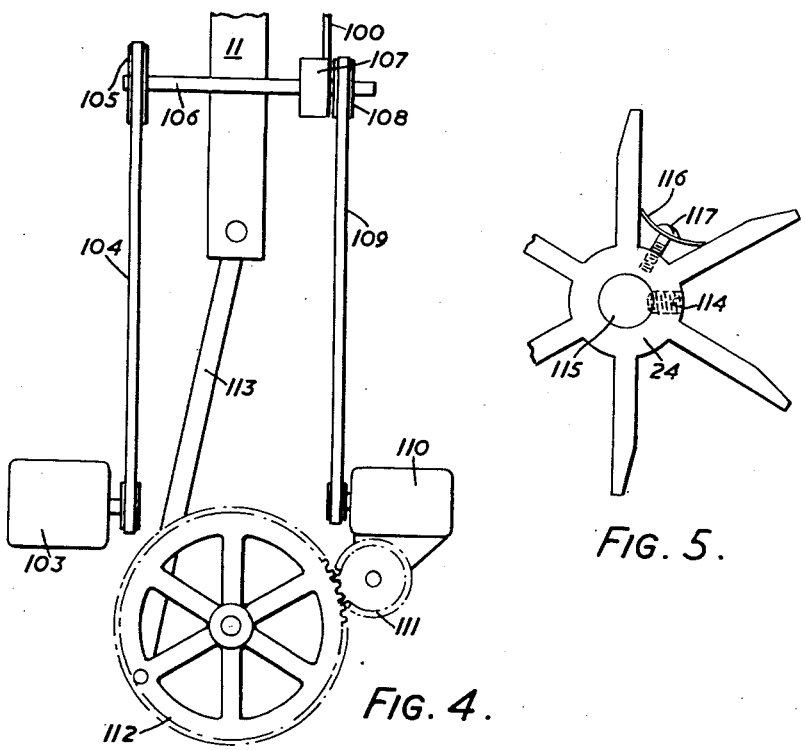
FIG. 5.
FIG. 4.

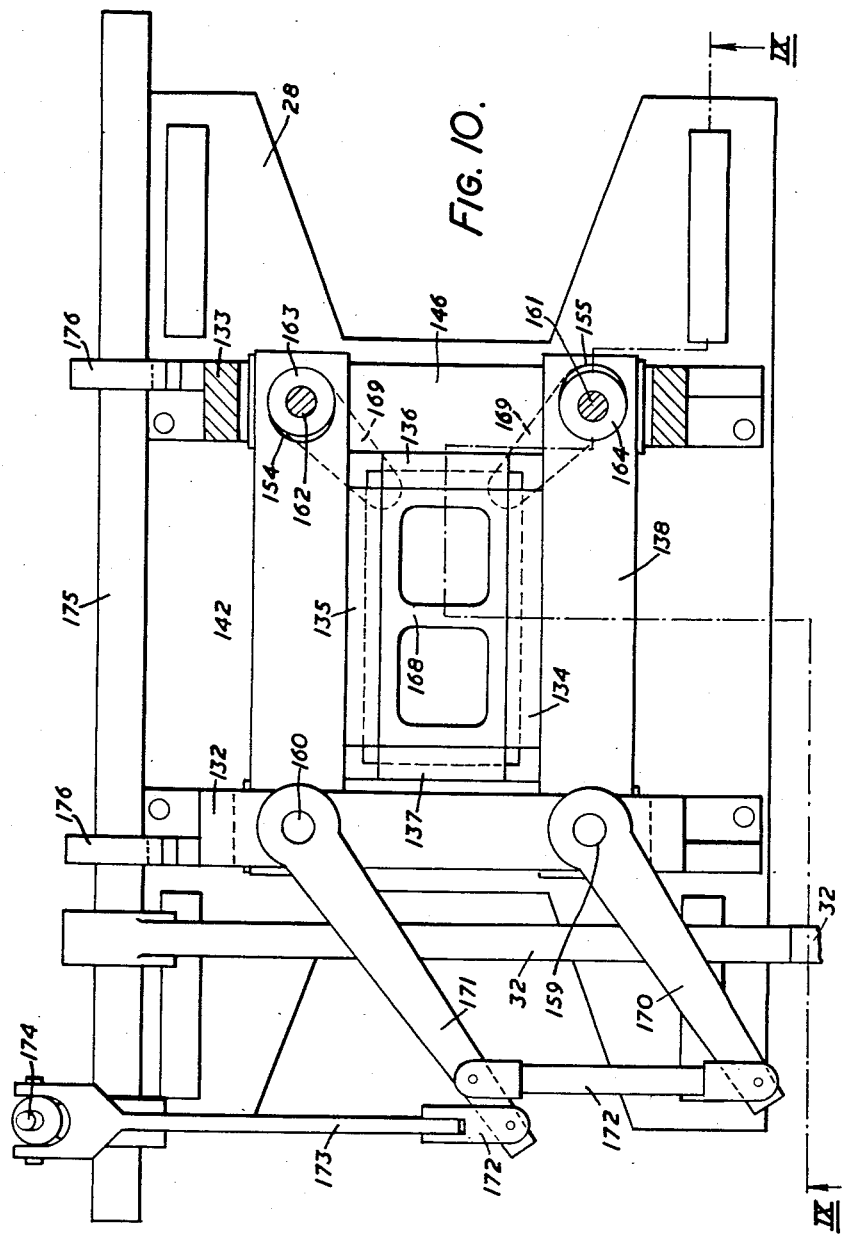

2,984,888

PROCESS FOR MAKING HOLLOW CONCRETE BLOCKS

Percy Pius Collens, Fairways Upper Drive, Angmering-on-Sea, England

Filed Aug. 30, 1956, Ser. No. 607,146

Claims priority, application Great Britain Sept. 2, 1955

2 Claims. (Cl. 25—155)

This invention relates to a process for the manufacture of hollow concrete blocks. The invention is particularly directed to the problem of providing a process for the automatic and continuous manufacture of light-weight hollow concrete blocks.

The process according to the invention comprises the step of moulding concrete mix in a mould to a wall thickness of less than 1¼" and, under a pressure of not less than 1000 p.s.i. Preferably the wall thickness is 1" or less.

The following features make successful operation of the process more easy of achievement. The inner surface of the mould should be hard. The most satisfactory results so far have been achieved by the use of mild steel, surface hardened, for the mould. Furthermore, the inner surface of the mould should be polished. The core or cores used for forming the hollow interior of the block should also be hardened and polished. An expandable mould should be used in order to avoid damage to the moulded block during removal of the block from the mould. For the consolidation of the concrete in the mould, vibration may be used in addition to pressure. This vibration may be applied while the mould is being filled with concrete.

The concrete mix used should preferably have an aggregate; cement ratio of between 6:1 and 4:1, and the aggregate may have a maximum size of ⅜₁₆". The water ratio may be between 35% and 50% of the cement by weight.

In a preferred embodiment of the process a hollow block having two longitudinal cavities and a wall thickness of ¾" is moulded in an expandable mould, the inner surfaces and the cores of which have been case hardened, ground, and polished, under a pressure of not less than 1 ton s.i. The concrete mix may be 2 parts coarse aggregate, maximum size ¾", 2 parts medium sand, 1 part fine sand, and 1 part of cement, with a water ratio of 40%.

Further according to the invention, a machine for carrying out the process comprises an expandable mould, the inner surface of which is hard and polished, a core for forming a cavity in a block being moulded, means for automatically feeding a concrete mix into the mould, means for compressing concrete in the mould under a pressure of not less than 1000 p.s.i., and means for automatically expanding the mould and removing a moulded block therefrom.

This embodiment of the machine will now be described, first generally, and then in greater detail, with reference to the accompanying drawings, in which:

Figure 3 is a plan view of part of control means for the machine.

Figure 4 is a side view of a mechanical press for the machine.

Figure 5 is a part side view of a feed paddle.

Figure 10 is a plan view in part section of an expanding jacket mould.

Figure 1:
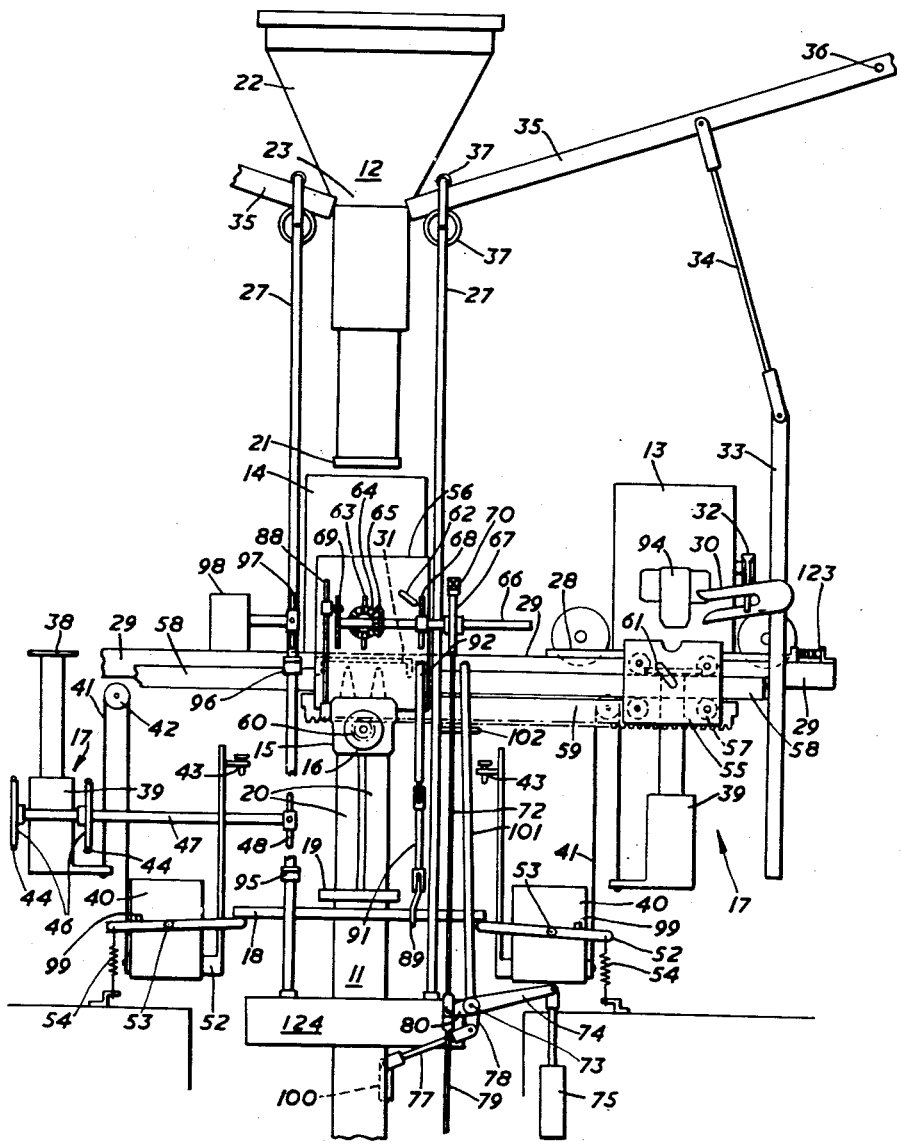
Figure 1 is a front view of the machine, largely diagrammatic.
Figure 2:
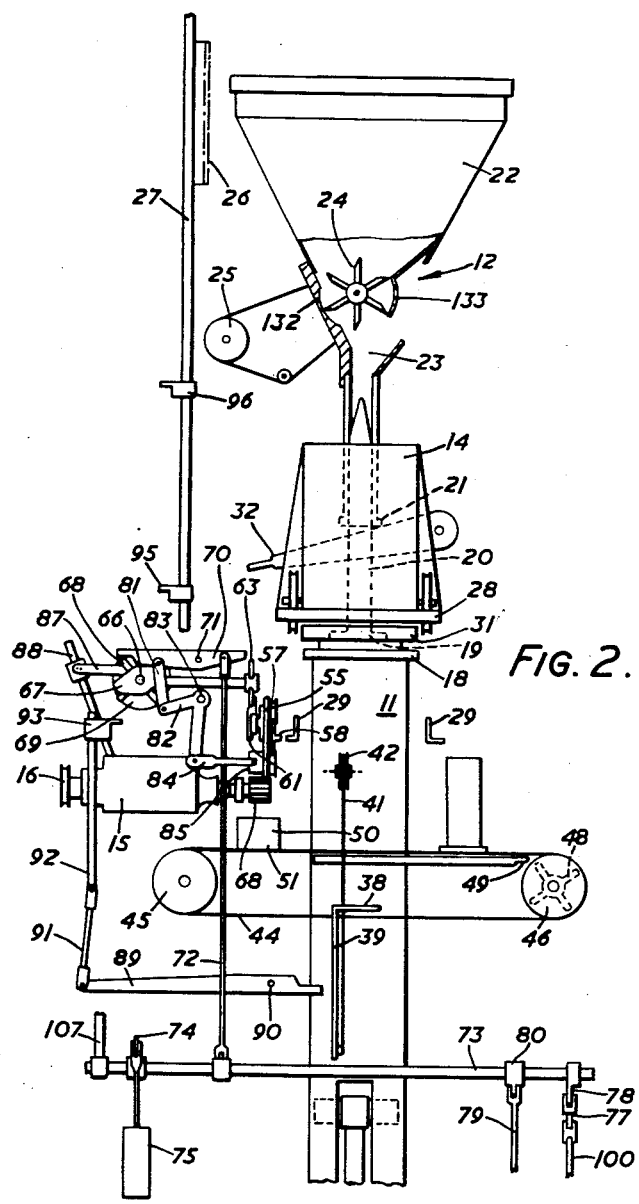
Figure 2 is a side view of the machine, also largely diagrammatic.

With reference to Figures 1 and 2 which are largely diagrammatic and in which the framework of the machine, to which the various parts which do not move are attached, is not shown, the machine essentially comprises a reciprocable ram 11, concrete feeding means indicated generally as 12, and two jacket moulds 13, 14. The reciprocable ram may be hydraulic or may be mechanically driven. In these two figures the ram reciprocating means is not shown. Means are also provided for traversing the two jacket moulds, so that first one and then the other is in the moulding position between the ram 11 and the feeding means 12. The mould traversing means may be driven by a motor, not shown, which drives a gear box 15 through a belt wheel 16. Unloading means indicated generally at 17, are provided for removing moulded blocks from the moulds and carrying them away from the machine. A control mechanism is also provided, which controls the following operating cycle in the machine.

At the start of a cycle (see Figure 1) one mould 14 is in moulding position, the other mould 13 is in unloading position, and the ram is beginning to rise from the bottom of its stroke. As the ram rises, concrete is fed into the mould 14 from the feeding means 12. The ram then lifts the mould off a track on which it is supported, and carries it upwards. The lower end of the feeding means enters the mould as it rises, and the concrete in the mould is compressed between the ram 11 and the lower end of the feeding means. While the ram has been rising, jacket opening means have expanded the jacket mould 13, and the released block is lowered from the jacket by the unloading means 17 onto a conveyor.

The ram then falls again, allowing the mould 14 to come down onto its track again, and simultaneously the mould 13 is closed again by the opening means operating in reverse.

At the bottom of the ram stroke the control means operate to brake and declutch the ram, and to clutch in the mould traversing means, which move the unloaded mould 13 into moulding position, and the mould 14 containing a newly moulded block into another unloading position on the other side of the machine. At the end of the traverse, the traversing means are declutched and the ram is again clutched in. The ram rises and falls, compressing another block as before, this time in mould 13, and then is again declutched and the traversing means clutched in in the opposite direction of traverse. At the end of this second traverse, the traversing means are declutched and the ram clutched in, and the machine is back at the start of the cycle.

Thus in each cycle two blocks are moulded and one is unloaded in each of the unloading positions.

The ram 11 carries a lift plate 18, and above the lift plate a base plate 19. On the base plate are mounted two core moulders 20, ground, case hardened, and polished. The lower end of the feeding means 12 is a plate 21, which is provided with two holes through which the core moulders 20 can pass. Concrete mix leaves the feeding means through these holes while the ram is rising. Then the core moulders enter the holes and close them, while the plate forms the top of the mould during compression. This can be seen in Figure 2 in dotted outline.

The feeding means comprise a hopper 22, a compression funnel 23, a feed paddle 24 driven by a chain drive from a feed sprocket 25, which in its turn is driven by a pinion from a rack 26 provided on a guide rod 27 which at its lower end (see Figure 1) is connected to a member 124 mounted on the ram. As the ram rises, guide rod 27 rises with it and rack 26 drives the paddle in a clockwise direction with regard to Figure 2. The position of the rack on the guide rod and the length of the rack, control respectively the timing and the duration of the feeding operation. The ends of the paddle blades move between an arcuate depresion in a plate 132 and a curved plate 133. Arcuate depression and curved plate are both of such size as at least to extend between two neighbouring paddle blades, so avoiding accidental and uncontrolled flow of concrete mix between the paddle and the hopper. A free-wheel arrangement prevents operation of the feeding means by the rack when the ram is descending.

In Figure 1 jacket mould 13 is shown in unloading position. Both moulds are supported on carriages 28, the wheels of which run along tracks 29. Jacket mould 14 which is in moulding position is shown only in outline, and the carriage on which it is supported is not shown, to avoid confusion with the parts of the control means shown in the figure. In Figure 2 mould 14 is shown during compression, its carriage 28 being lifted by the ram off the tracks 29.

The jacket moulds are open at top and bottom. As already explained, plate 21 forms the top of the mould during compression. The bottom of the mould is formed by a floating plate 31, which normally rests on supports (not shown) in the position indicated in dotted outline in Figure 1. Holes are provided in the floating plate through which the core moulders 20 can pass as the ram rises. As the ram continues to rise the floating plate 31 is lifted by base plate 19 against the bottom of the jacket mould, and then ram, floating plate, and mould rise together as shown in Figure 2. Vertical guide means may be provided for the floating plate and for the mould.

During the downward stroke of the ram, plate 21 at the lower end of the feed means is left behind, opening the top of the mould. The carriage 28 then settles on track 29 again, and floating plate 31 returns to its supports. As the ram continues to descend, the core moulders 20 are withdrawn from the mould, through plate 31. The traversing means then come into operation and the mould moves to unloading position leaving the floating plate behind. The mould is thus open at the bottom, ready for removal of the moulded block downwards by the unloading means 17.

Each mould is expandable by a cam action, controlled by an expanding lever 32. When a mould moves to unloading position (see mould 13 in Figure 1), the end of this lever enters fingers 30. Figure 1 only shows this arrangement on one side of the machine, the similar arrangement on the other side being omitted for clarity. The fingers 30 are carried by a rod 33 which is vertically slidable in guides (not shown). A link 34 connects rod 33 to an arm 35 pivoted to the frame of the machine at 36. The upper end of guide rod 27 is slotted, and arm 35 passes through this slot between two wheels 37. As the ram rises during moulding, the guide rod 27 rises and through arm 35, link 34, and rod 33 lifts fingers 30, so operating the expanding lever 32, expanding the jacket mould and releasing the moulded block onto the unloading means. The unloading means operate while the ram continues to rise, and by the time the ram is at the top of its stroke the mould has been unloaded. During the descending stroke of the ram the guide rod 27, arm 35, link 34, rod 33 and fingers 30 operate in reverse to close the expanded mould.

The end of arm 35 beyond pivot 36 (not shown) may carry a counterweight for the weight of the link, rod and fingers, in order to facilitate the operation of the mould expanding means.

The unloading means are most clearly seen on the left of Figure 1, and they comprise essentially a platform 38 carried by a frame 39, and a counterweight 40, connected to the frame 39 by a cable 41 passing over a pulley 42, which is mounted on the machine frame. The weight of frame 39 and platform 38 together with the weight of a moulded block are less than the weight of counterweight 40, which thus keeps the platform in a raised position as shown in Figure 1. A stop (not shown) is provided to limit the downward motion of the counterweight 40. An unloading arm 43 is connected to the counterweight 40.

As the ram rises from the position shown in Figure 1, first of all the mould expanding means are operated. The platform 38 carries a wooden pallet, not shown in Figure 1, and the expanding of the mould leaves the moulded block on this pallet. As the ram continues to rise, lift plate 18 engages unloading arm 43, and lifts it and with it counterweight 40. This allows the frame 39 to fall, so lowering platform 38 and the moulded block.

Two conveyor chains 44 each run round wheels 45, 46. The platform 38 can pass between these chains, but the wooden pallet is wider than the distance between the chains, and thus as the platform descends the pallet and the moulded block are left on the conveyor chains. Wheels 46 are mounted on an axle 47 the other end of which carries a spider 48. In Figure 1 the guide rod 27 on the left is broken to show this spider. As the ram continues to rise after the pallet and block have been left on the chains, a conveyor tripper 49 attached to the ram 11 (see Figure 2) engages the spider and turns it through a quarter turn. This turns wheels 46 and so moves the conveyor chains bringing the pallet and block to the position shown in Figure. 2.

As the ram descends again, the counterweight 40 descends with it, once more raising frame 39 and platform 38 between conveyor chains 44. The conveyor tripper 49 is hinged in such a manner as to pass the conveyor spider 48 inoperatively during the downward motion of the ram. At the end of the descent of the ram the unloading means are again in the position shown in Figure 1. The traversing means then take the unloaded mould into moulding position and the mould containing the newly moulded block moves into the unloading position on the other side of the machine.

Wooden pallets 51 are stacked in a reservoir 50 which is open at top and bottom, and is mounted above the conveyor chains 44 with openings at front and rear of a thickness slightly greater than the thickness of one pallet. U-clips are fastened to the chains at intervals in opposed parts one on each chain. As the chains advance during operation of the machine, the pairs of U-clips pull one pallet at a time from the bottom of the reservoir.

Every time a block is moulded, the conveyor tripper 49 turns the spider 48 a quarter turn. Since blocks are unloaded alternately to the left and to the right of the machine, one pallet is required on each side of the machine for every two moulding operations. The pairs of U-clips are therefore spaced apart from each other by the distance the conveyor chains move for a half turn of the spider 48.

After a block has been deposited on the conveyor chains as already explained, the platform 38 rises again freely between chains 44 as the ram descends. The traversing means operate and the ram rises again. The platform 38 descends empty (meanwhile the unloading means at the other end of the machine are unloading a block). As it reaches the bottom of its descent, the conveyor chains are again moved forward, and this time the U-clips on the chains bring a pallet from the reservoir to a point directly above platform 38 and below where the mould will be during unloading. The platform 38 then rises, picking up the pallet on the way, until the unloading means are back in the position shown in Figure 1.

For satisfactory removal of a moulded block from a mould onto a pallet, the pallet must be brought right up against the open lower end of the jacket mould. In this position the pallet would interfere with the mould and its carriage during traversing of the moulds. Means are therefore provided whereby the platform 38 and pallet are slightly lowered during traversing.

These means comprise a lever 52, pivoted to the frame of the machine at 53 and with one end attached to the frame of the machine through a spring 54. When the ram reaches the bottom of its stroke and the traversing means are switched in, lift plate 18 strikes the end of lever 52 as shown in Figure 1. The other end of the lever rises, and by means of an abutment 99 on the counterweight lifts the counterweight 40 slightly, thus slightly lowering platform 38. At the end of traversing the ram starts to rise again, and spring 54 pulls the lever down into its original position allowing the counterweight to fall, and bringing platform 38 with the pallet upon it firmly against the bottom of the jacket mould.

The traversing means and the control means will now be described.

Two side carriages 55 and 56 are provided respectively for moulds 13 and 14. These side carriages engage by means of wheels 57 with a track 58. The two side carriages are connected together by means of a rack 59. This rack is driven by a pinion 60 from the gearbox 15. Each side carriage engages a jacket mould or mould carriage in such a way that the mould moves with the side carriage horizontally, but can be disengaged vertically. This disengagement takes place during moulding.

The side carriages each carry a traverse tripper, 61 and 62, for turning a traverse spider 63. Tripper 61 on side carriage 55 is arranged to trip a lower arm of the spider, and tripper 62 on side carriage 56 is arranged to trip an upper arm of the spider. Both trippers are hinged so that they only operate the spider when the mould to which they are engaged through the side carriage is moving from unloading position into moulding position. By the arrangement of the trippers, one above and one below the level of the spider, they always operate to turn the spider in the same direction, which is clockwise in Figure 1.

In Figure 1, mould 14 has just arrived in moulding position, and tripper 61 has turned spider 63 through a quarter turn clockwise.

Spider 63 is connected to a bevel gear wheel 64, which meshes with another bevel wheel 65 on an axle 66. This axle carries a cam 67, a control spider 68, and a crank disc 69. These parts are shown in plan view in Figure 3. When traverse spider 63 is turned clockwise through a quarter turn, the axle 66 is also turned clockwise (with reference to Figure 2) through a quarter turn by means of the bevel gears. This moves cam 67 into the position in which it is shown in Figure 2. A lever 70 follows the cam 67. Lever 70 is pivoted at 71, and at the opposite end from the cam is hinged a connecting rod 72, which is attached by a short arm 76 to a shaft 73. An arm 74 attached to the shaft carries a weight 75 tending to turn the shaft in a clockwise direction from the point of view of Figure 1. Through arm 76 and rod 72, this turning tendency urges lever 70 against cam 67.

A clutch lever 100 controlling the press is connected to shaft 73 through a connecting rod 77 and a short arm 78. A brake rod 79 also controlling the press is connected to shaft 73 through a short arm 80. When cam 67 moves into the position shown in Figure 2, lever 70 moves after it under the influence of weight 75, and shaft 73 turns clockwise. This operates clutch lever 76 and brake rod 79 removing the brake which was previously applied, and clutching in the press.

The end of lever 70 which moves with the cam is joined by a link 81 to an L-lever 82 pivoted at 83. The other arm of L-lever 82 is hinged to a safety bolt 84. As lever 70 moves downwards to follow the cam, it turns the L-lever and moves safety bolt 84 into a safety socket 85 fixed on the back of the rack 59. The socket 85 is in such a position that the safety bolt cannot enter it unless rack 59 is in the correct position, i.e. in a position such that the mould is in correctly centralised moulding position. If by any chance at the end of the traverse the mould is not in correct moulding position, the safety bolt cannot enter the socket. As a result, lever 70 cannot follow the cam 67 downwards, shaft 73 is not turned, and the press is not unbraked and clutched in. A similar safety socket is fixed on the opposite end of the rack in such a position as to centralise the other jacket mould when it is in moulding position.

When axle 66 is turned through a quarter turn by the bevel gears, it also turns a crank disc 86 to which is attached a crank 87 pivoted to a gear lever 88 for the gearbox 15. The position of gear lever 88 in Figure 2, to which it has been moved by the quarter turn of the crank shaft, is its neutral position, i.e. the traversing mechanism is unclutched.

The ram now rises, compresses a block, and descends again. At the end of its descent lift plate 18 depresses the end of a control lever 89, which is pivoted at 90. The other end of the control lever 89 is attached by a connecting rod 91 to a push rod 92 (shown broken off in Figure 1), which moves in vertical guides (not shown). To the top of push rod 92 is fixed a trip lever 93. When the inner end of lever 89 is depressed by the lift plate, the push rod rises and trip lever 93 turns control spider 68, and hence axle 66 through another quarter turn in a clockwise direction. Cam 67 turns and raises lever 70, thus turning shaft 73 anticlockwise (Figure 1) through rod 72 and arm 76. The rotation of shaft 73 declutches the press and brakes it. At the same time the raising of lever 70 retracts safety bolt 84 from socket 85.

A clockwise quarter turn of the crank disc 69, moves gear lever 88 to the right. This brings pinion 60 into gear in such a direction as to traverse the moulds, and bring mould 13 into moulding position. At the end of the traverse, traverse tripper 61 engages traverse spider 63 and turns it, and hence through the bevel gears, axle 66, another quarter turn. The ram then starts to rise again. As the pressure on control lever 89 is released, push rod 92 falls, but trip lever 93 is so arranged as to pass spider 68 inoperatively in its downward stroke. The half cycle described is then repeated, with the only difference that the crank disc in turning is now moving the crank to the left (Figure 2) so that at the end of the next compression stroke the gear lever 88 is moved to the left and pinion 60 is geared in the opposite direction, so that the moulds traverse in the opposite direction. It will be noted that the direction of rotation of axle 66 and its fittings and of traverse spider 63 is the same throughout the operating cycle.

Electrically controlled vibrators may be provided on the moulds. One is shown in Figure 1 at 94. Preferably, two such vibrators are provided on each mould, mounted on opposite sides. The vibrators on mould 14 are not shown. It is also possible to provide a vibrator for the core moulders 20. All the vibrators are arranged to give a predominantly vertical vibration.

Switch trippers 95, 96 are provided on a guide rod 27 in such a manner that each tripper will turn a switch spider 97 (not shown in Figure 2) through a quarter turn on upward movement of the guide rod, but will pass the spider inoperatively on downward movement of the guide rod. Spider 97 controls a vibrator switch 98. The trippers and switch are preferably so arranged that, as the ram rises, tripper 95 switches on the vibrators at the start of the feeding of the concrete mix, and tripper 96 switches off the vibrators as mould 14 is lifted off track 29 by the ram. The feeding of the concrete mix takes place approximately over the same period of time as the expansion of the jacket mould being unloaded, and the beginning of the descent of the unloading platform 38. Vibration of the mould being unloaded assists removal of the moulded block therefrom.

A safety lever 101 is attached to shaft 73. The lever is shown broken off in Figure 2. If at any moment it is desired to stop the machine, the lever 101 is moved to the left (Figure 1) where it can be engaged with a catch plate 102. This turns the shaft 73, braking and declutching the press.

A suitable form of mechanical press is shown in Figure 4. A 10-H.P. motor 103 drives a belt wheel 105 through a belt 104. Belt wheel 105 is mounted on an axle 106 which also carries a clutch 107, controlled by clutch lever 100 (see Figure 1). Clutch sprocket 108 drives a worm reducing gear 110 through a chain 109. Gear 109 is coupled to dual pinions 111 which in turn drive crank gear wheels 112 at a final speed of 2 r.p.m. Gear wheels 112 drive ram 11 through a crank 113. In the figure only one each of pinions 111 and crank gear wheels 112 are shown. The others are similarly arranged on the other side of crank 113.

A fine adjustment of the amount of concrete mix fed to the moulds may be made by means shown in Figure 5, which shows the feed paddle 24, fastened by a grub screw 114 to an axle 115, which is driven by a belt from a belt wheel attached to feed sprocket 25. The adjustment means comprises a series of resilient metal plates 116 (only one of which is shown) arranged between each of the paddle blades. Each plate is fastened to the paddle by a bolt 117. By tightening the bolt, the plate is drawn nearer to the centre of the paddle and bends, as shown in the figure, thus increasing the available volume between the paddle blades. The drive to the paddle may be such that for each mould filling operation the paddle makes one complete revolution. By adjusting the resilient plates 116 the amount of concrete fed in this revolution may be adjusted to an accuracy of the order of an ounce.

Figure 6:
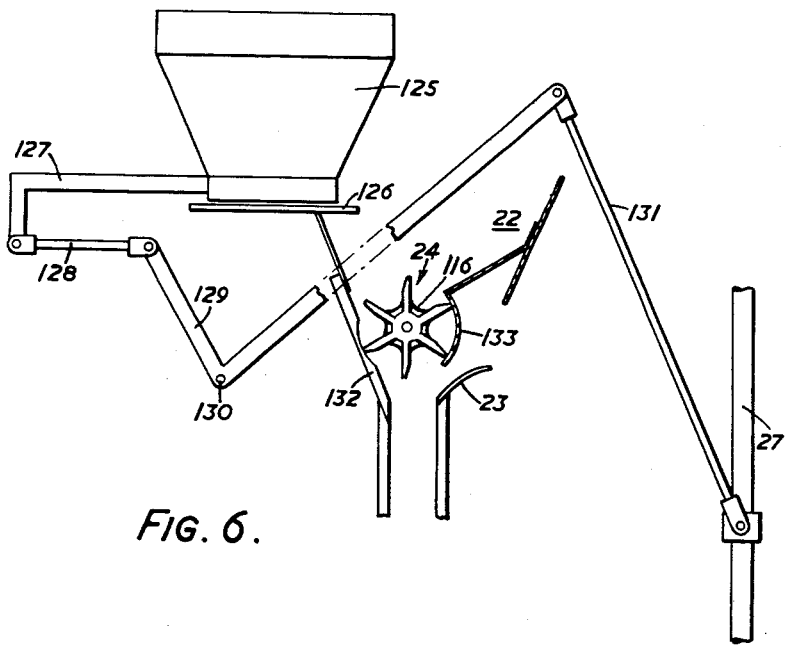
Figure 6 is a side view of an alternative form of feed hopper.

A variation of the hopper arrangement is shown in Figure 6. In this case a movable hopper 125 is provided, the bottom of which is open, and which rests, in the position of Figure 6, on a plate 126. An L shaped arm 127 is connected to the movable hopper 125, and is in its turn connected by a connecting rod 128 with an L-lever 129 pivoted to the frame of the machine at 130. The other end of L-lever 129 is connected by a connecting rod 131 to push rod 27.

The position shown is at the top of a compression stroke of the ram. As the ram and with it push rod 27 descends, the linkage 131, 129, 128, 127 will slide movable hopper 125 to the right, so that concrete mix can drop from hopper 125 into hopper 22, provided that hopper 22 is not filled with mix to the level of plate 126. When the ram rises again, hopper 125 slides again to the left. In this way the amount of mix in hopper 22 during the feeding operation is kept substantially constant, so making more accurate adjustment of the amount of mix passed by the feeding means possible.

Figure 7:
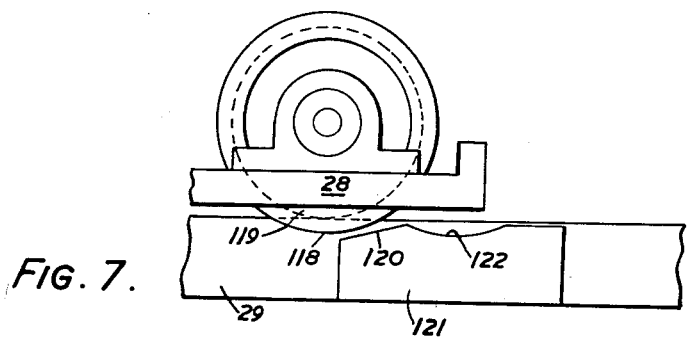
Figure 7 is a front view of part of a track on which the moulds traverse.

Means for bringing the moulds and rack into a position such that the safety bolt 84 can enter the socket 85 are shown in Figure 7.

As a mould on its carriage 28 moves to unloading position, a flange 118 on the wheels 119 which are in advance in the direction of motion meet a ramp 120 provided on a plate 121 which is attached to the side of track 29. The flange rides up the ramp 120 and then settles in an arcuate depression 122. This fixes the position of the carriage, and hence through the side carriage 55 or 56 engaged with it, of the rack 59 carrying the safety sockets 85. A buffer 123 (see Figure 1) may be provided at each end of the track 29.

Figure 8:
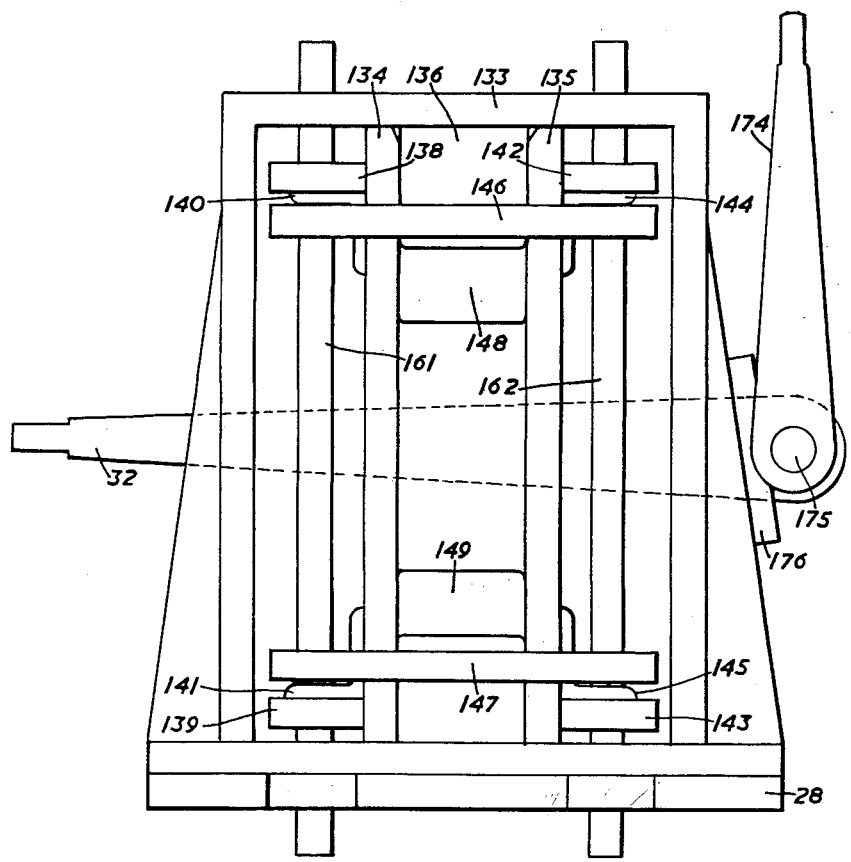
Figure 8 is a side view of an expanding jacket mould.
Figure 9:
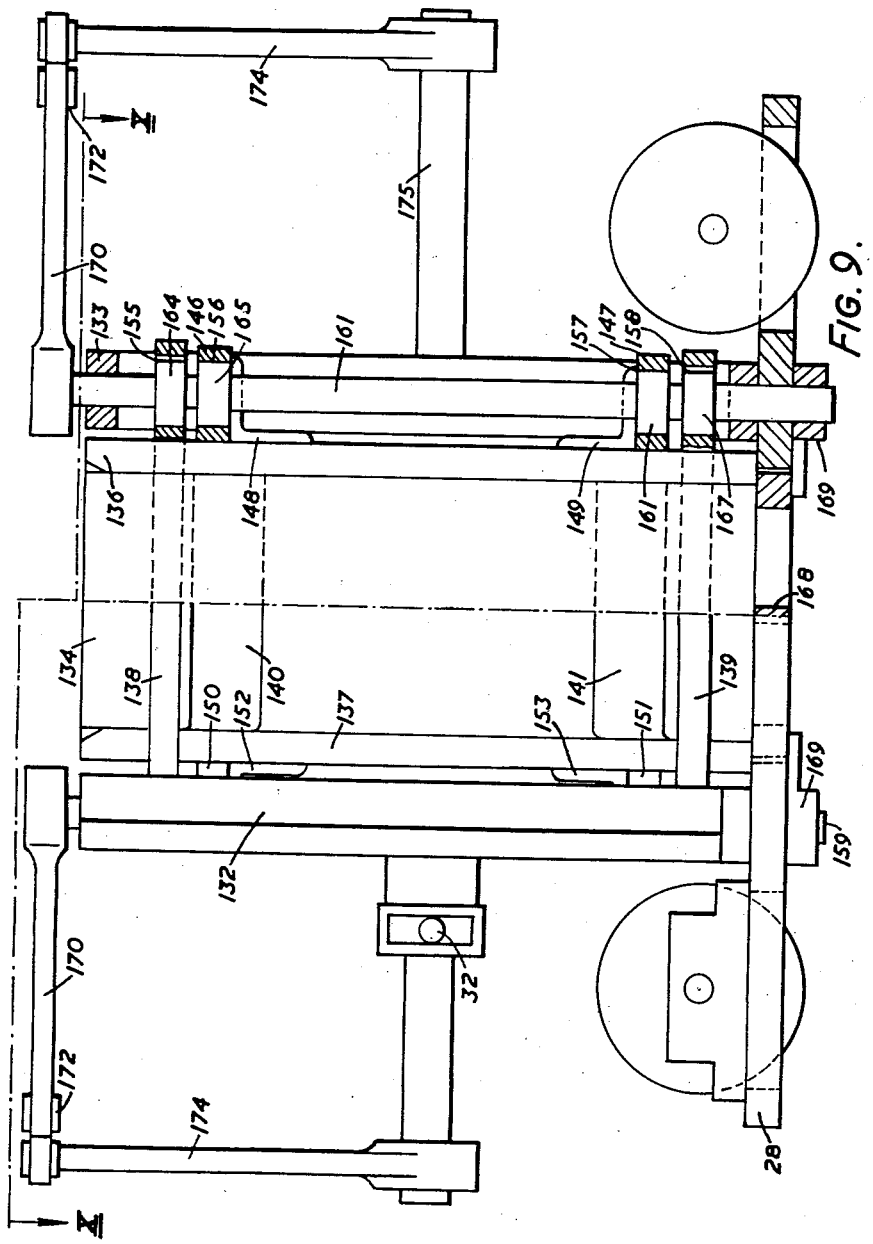
Figure 9 is a front view in part section of an expanding jacket mould.

The expandable mould is shown in Figures 8, 9, and 10. The mould comprises a frame, mould sides, and cam means supported by the frame and supporting the mould sides.

The frame comprises a carriage or base plate 28, and two frame sides 132, 133. The mould proper comprises two wide mould sides, 134 and 135, and two narrow mould sides 136 and 137. Mould side 134 carries two cam plates, one, 138 near its upper end and one, 139 near its lower end. These cam plates are fastened to the mould sides by angle members 140 and 141 respectively. Similarly mould side 135 carries cam plates 142 and 143 fastened by angle members 144 and 145. Mould side 136 carries cam plates 146 and 147 fastened by angle members 148 and 149. Mould side 137 carries cam plates 150 and 151 fastened by angle members 152 and 153.

Each cam plate has at each end an aperture elongated in the direction parallel to the mould side to which the cam plate is attached. In Figure 10 two such apertures 154 and 155 are exposed on cam plates 142 and 138 respectively. In Figure 9 apertures 155, 156, 157 and 158 are shown in section through cam plates 138, 146, 147 and 139 respectively. It will be seen that the ends of cam plates on adjacent mould sides overlap so as to bring the apertures into approximate alignment.

In the frame side 132 are mounted cam shafts 159 and 160, and in frame side 133 are mounted cam shafts 161 and 162. Each cam shaft carries four cams in the form of eccentrics. In Figures 9 and 10 cams 163, 164, 165, 166 and 167 are shown respectively in apertures 154, 155, 156, 157 and 158. It will be seen from Figure 10 that if cam shafts 161 and 162 are given a quarter turn anticlockwise, cams 164 and 163 will move the ends of cam plates 138 and 142 outwards. Cam shafts 159 and 160 will move the other ends of the cam plates 138 and 142 outwards on a quarter turn clockwise. The same action takes place on cam plates 139 and 143, and thus mould sides 134 and 135 are moved outwards. In the same manner, through their associated cam plates, mould sides 136 and 137 are moved outwards, and so the mould is expanded.

In base plate 28 is an aperture for the release of the block. In this aperture there may be provided a plate 168 to act as a bottom for the mould proper. Plate 168 has two apertures for the passage of the core moulders. To the lower end of each of the cam shafts is fixed a member 169 (not shown in Figure 8) which reaches underneath and supports plate 168. However, when the cam shafts turn in order to expand the mould, these members 169 also turn, so releasing plate 168. This removable plate is an alternative to the floating plate 31.

The link and lever mechanism for controlling the cam shafts is shown on the left side of Figure 10 and in Figure 9.

To the top of each of cam shafts 159 and 161 is fastened a lever 170, and to the top of each cam shafts 160 and 163 is fastened a slightly longer lever 171. On each side of the mould levers 170 and 171 are joined by a link 172. The end of each lever 171 is joined by a universal joint 172 to a link 173, which in its turn is connected to a lever 174 mounted on an expanding shaft 175 which also carries expanding lever 32. Shaft 175 is mounted in bearings 176 on frame sides 132 and 133.

In operation, fingers 30 raise expanding lever 32, which rotates shaft 175. Through levers 174 and links 173 this acts on levers 171, 170, so rotating the cam shafts and expanding the mould.

It is of course possible to carry out the method of the invention with machines of a different construction to that here described, and variations are possible in the machine described. For example, the press may be hydraulically operated. The gear box 15 and associated traversing means may be dispensed with, and instead the traversing system may be both controlled and operated by a lever system from the press. The concrete feeding means may have an independent drive.

It has also been found advantageous to insert a shock absorber, for example of rubber, into the ram or ram mechanism, in order to equalise the moulding pressure despite variations that may occur in the density of the concrete mix.

What is claimed is:

1. A process for making hollow concrete blocks which comprises providing a concrete mix made up of about 2 parts coarse aggregate having a maximum size of 3/16", 2 parts medium sand and 1 part fine sand to 1 of cement by volume and from 35% to 50% water based on the weight of the cement, introducing a charge of a predetermined amount of said mix into an expandable mould closed on its sides, top and bottom by walls having an interior hard, polished, metal, surface and having a core having a hard, polished, metal, surface extending therethrough and forming side wall mould cavities not substantially greater than 3/4" in thickness, mechanically compressing the concrete mix in said closed mould by applying pressure at both top and bottom ends of said mould toward the center of said mould continuously (as distinguished from intermittently) in a single stroke until a pressure of at least one ton per square inch is applied to said mix in said closed mould thereby forming a compressed concrete block, then removing said core from said mould and expanding said mould and then removing the compressed moulded block therefrom, thereby to produce a hollow concrete block having a side wall thickness not substantially greater than 3/4".

2. A process according to claim 1 in which the mould is vibrated during the time the concrete mix is charged thereto.

References Cited in the file of this patent

UNITED STATES PATENTS

| | | |
|---|---|---|
| 803,092 | Buekermann | Oct. 31, 1905 |
| 938,699 | Pink | Nov. 2, 1909 |
| 949,924 | Adams | Feb. 22, 1910 |
| 1,122,669 | Trout | Dec. 29, 1914 |
| 1,264,606 | Bower | Apr. 30, 1918 |
| 1,442,967 | Papke | Jan. 23, 1923 |
| 1,527,041 | Garvin et al. | Feb. 17, 1925 |
| 1,531,479 | Erickson | Mar. 31, 1925 |
| 1,911,152 | Hever | May 23, 1933 |
| 2,094,727 | Stella | Oct. 5, 1937 |
| 2,131,803 | Henderson | Oct. 4, 1938 |
| 2,193,879 | Muenzer | Mar. 19, 1940 |
| 2,308,132 | Wellnitz | Jan. 12, 1943 |
| 2,324,884 | Seil | July 20, 1943 |
| 2,366,780 | Gelbman | Jan. 9, 1945 |
| 2,427,044 | Burns | Sept. 9, 1947 |
| 2,451,167 | Johnson | Oct. 12, 1948 |
| 2,460,167 | Carlsen | Jan. 25, 1949 |
| 2,512,092 | Dike | Jan. 20, 1950 |
| 2,593,409 | Brown | Apr. 22, 1952 |
| 2,620,541 | Davies | Dec. 9, 1952 |
| 2,672,669 | Davis | Mar. 23, 1954 |
| 2,685,116 | Schutt | Aug. 3, 1954 |
| 2,706,322 | Davies | Apr. 19, 1955 |
| 2,805,567 | Schrell | Sept. 10, 1957 |
| 2,842,827 | Nickelson | July 15, 1958 |

OTHER REFERENCES

Stearns Joltcrete in June 1940 issue of Concrete, page 15, copy in Div. 95.